J. B. WEST.
Screw-Driver.
No. 201,372. Patented March 19, 1878.
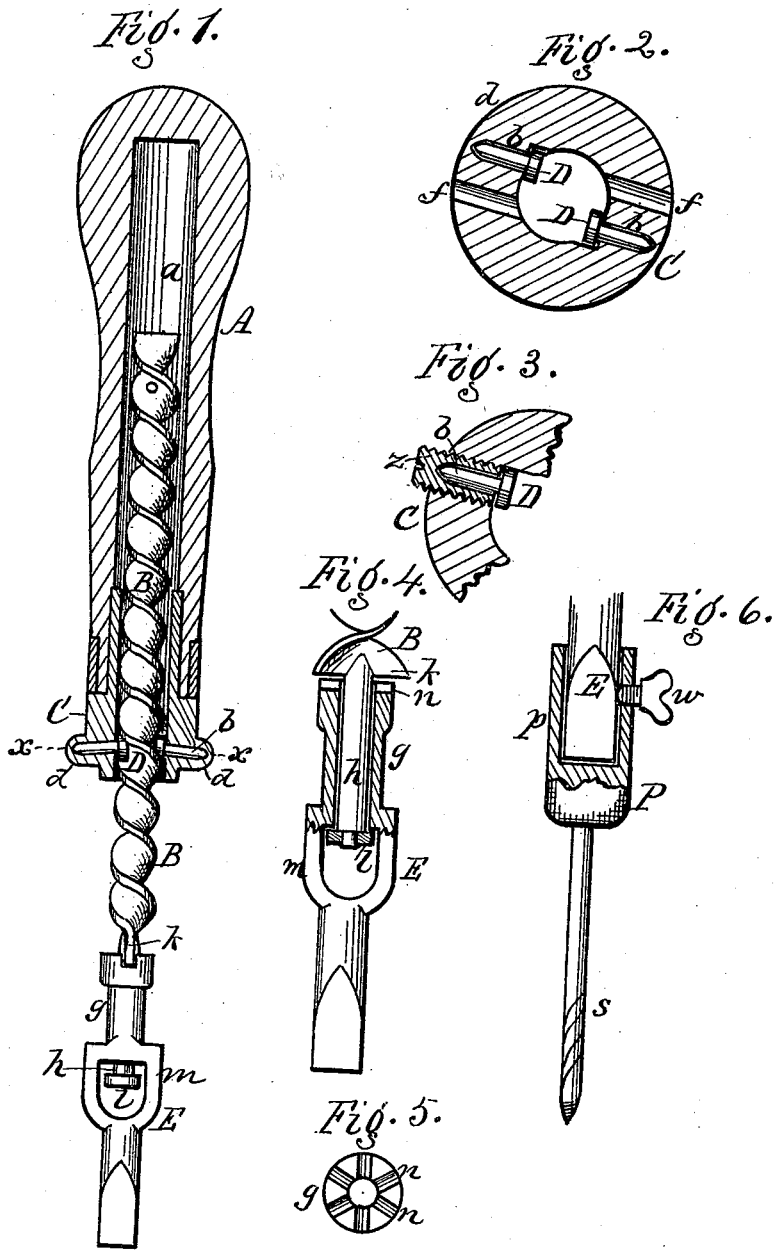
Attest.
R. E. White
Jacob Spahn
Inventor.
Jonathan B. West,
per R. F. Osgood,
atty.

UNITED STATES PATENT OFFICE.

JONATHAN B. WEST, OF GENESEO, NEW YORK.

IMPROVEMENT IN SCREW-DRIVERS.

Specification forming part of Letters Patent No. 201,372, dated March 19, 1878; application filed May 4, 1877.

*To all whom it may concern:*

Be it known that I, JONATHAN B. WEST, of Geneseo, in the county of Livingston and State of New York, have invented a certain new and useful Improvement in Screw-Drivers; and I do hereby declare that the following is a full, clear, and exact description of the construction and operation of the same, reference being had to the accompanying drawings, in which—

Figure 1 is a central vertical section of the device. Fig. 2 is a cross-section in line $x\ x$ of Fig. 1. Fig. 3 is a modification of Fig. 2. Fig. 4 is a sectional elevation of the swiveled stock at the bottom of the instrument. Fig. 5 is a plan of Fig. 4. Fig. 6 is an elevation, showing a gimlet or bit attached to the screw-driver.

My improvement relates to that class of screw-drivers in which a spiral shank, like an auger, is employed for operating the driving-blade. Such devices are already known.

My invention consists in combining, with the spiral shank, friction-rollers of peculiar construction; also other devices, as hereinafter more fully described and definitely claimed.

A represents a wooden handle, of ordinary form, having a central tube or passage, $a$, extending nearly to the top, in which rests the spiral shank. B is the spiral shank, which is in the form of an auger or screw, but with a reverse twist, in order to turn the screw that is being operated upon down instead of up. C is a socket-piece, of metal, inserted in the lower end of the handle, and extending up some distance in the passage $a$, in order to secure a firm bearing. This socket-piece has a passage similar to $a$, and the spiral shank fits closely therein, but turns freely.

D D are two friction-rollers, having shafts $b\ b$, which fit in the socket-piece C. The shafts are solid with the rollers, and their rear ends are rounded or pointed, so as to wear smooth and retain a firm bearing. To give room to these shafts the socket-piece C is provided with a ring or enlargement, $d$, Fig. 1, which may extend all or a part of the way around. A peculiar feature consists in setting the axis of these rollers at an upward angle, as shown in Fig. 1, and in a tangential or diagonal direction, as shown in Fig. 2, by which means the rollers stand directly in line with the travel of the threads of the screw, and have a firm square bearing beneath the edges of the threads, preventing the grinding and the unequal wear, both on the threads and on the edges of the rollers, that would occur if the latter were set in horizontally and at direct right angles to the axis of the screw. In the latter case one edge only of the rollers would receive the bearing, and grooves would be cut in the threads, and the edges of the rollers would wear off, producing looseness and irregular action.

In order to form the sockets for the reception of the roller-shafts, holes $f f$, Fig. 2, are bored through from the opposite sides, thereby admitting the boring-instrument, and allowing the same to form the bearings without boring through. These holes may afterward be plugged, if desired.

I intend to employ screws $z\ z$, made hollow, to receive the roller-shafts, as shown in Fig. 3, the screws being closed at the outer end to form the bearing, and screwing bodily into the socket-piece C. By this means the rollers may be adjusted in and out, to adapt the rollers to a true fitting to the spiral shaft.

E is the blade at the bottom of the instrument, forming the screw-driver proper. Its lower end is flattened to enter the slot of the screw. Its upper end has a hollow socket, $g$, in which fits loosely a cylindrical stem, $h$, formed on the lower end of the spiral shaft. This stem is made a little longer than the socket in which it rests, so that when raised, as shown in Fig. 4, the lips $k\ k$ of the screw will run clear of the top of the socket. The socket is retained upon the stem by a washer, $l$, riveted on the lower end of the stem, a loop or opening, $m$, being formed in the shank to allow it to be attached. The top of the socket $g$ is formed with a series of radial slots, $n\ n$, Fig. 5, of sufficient size to receive and hold the lips $k\ k$ of the spiral shaft when dropped therein.

The operation is as follows: When pressure is applied on the upper end of handle A the lips $k\ k$ will engage with the slots $n\ n$ of the driver-blade. The pressure of the handle will cause the spiral shaft to rotate, and consequently will impart motion to the blade E, and operate the screw to be driven. When the handle is fully run down, the blade E is held by one hand in engagement with the screw, while the handle is raised by the other hand. In so raising the handle the lips k k are first drawn out of the slots n n, and the spiral shank then revolves free, to allow the handle to rise. By this means the action may be renewed as often as necessary in driving the same screw without releasing the hold from the screw.

P, Fig. 6, is a gimlet or bit attachment. It consists of the gimlet or bit s and a socket, p, which fits upon the part E, and is held thereto by a set-screw, w.

Having thus described my invention, I do not claim, broadly, a spiral or screw shank for multiplying the rotations of the screw-driver; neither do I claim, broadly, a swiveled blade or driver at the end; but

I claim—

1. In a screw-driver, the combination, with the spiral shank B, of the rollers D D, provided with shafts b b, set obliquely and inclined upward to the threads of the shank, in the manner and for the purpose specified.

2. In a screw-driver, the combination, with the rollers D D, provided with the shafts b b, of the screws p p, inclosing the shafts, and serving to adjust said rollers in and out to fit the threads of the spiral shanks, as shown and described, and for the purpose specified.

3. In a screw-driver, the swiveled blade or driver E, constructed with the slots or notches n n in its top, and provided with a socket, in combination with the spiral shank B, constructed with lips k k, which strike into the slots, and provided with a stem, h, which enters the socket of the blade, as shown and described, and for the purpose specified.

In witness whereof I have hereunto signed my name in the presence of two subscribing witnesses.

JONATHAN B. WEST.

Witnesses:
R. F. OSGOOD,
JACOB SPAHN.